US009764733B2

(12) United States Patent
Thompson et al.

(10) Patent No.: US 9,764,733 B2
(45) Date of Patent: Sep. 19, 2017

(54) METHODS AND SYSTEM FOR STARTING AN ENGINE OF A HYBRID VEHICLE

(71) Applicant: Ford Global Technologies, LLC, Dearborn, MI (US)

(72) Inventors: Scott James Thompson, Canton, MI (US); David Farrell, Dearborn, MI (US); Robert Wright, Royal Oak, MI (US); Xiaoyong Wang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/252,020

(22) Filed: Aug. 30, 2016

(65) Prior Publication Data

US 2016/0368486 A1 Dec. 22, 2016

Related U.S. Application Data

(62) Division of application No. 14/448,917, filed on Jul. 31, 2014, now Pat. No. 9,463,790.

(51) Int. Cl.
*B60W 20/40* (2016.01)
*B60K 6/26* (2007.10)
*B60W 10/02* (2006.01)
*B60W 20/13* (2016.01)
*B60W 10/08* (2006.01)
*B60W 10/06* (2006.01)
*B60K 6/387* (2007.10)
*B60K 6/547* (2007.10)
*B60W 10/26* (2006.01)

(Continued)

(52) U.S. Cl.
CPC ............... *B60W 20/40* (2013.01); *B60K 6/26* (2013.01); *B60K 6/387* (2013.01); *B60K 6/547* (2013.01); *B60W 10/02* (2013.01); *B60W 10/026* (2013.01); *B60W 10/06* (2013.01); *B60W 10/08* (2013.01); *B60W 10/26* (2013.01); *B60W 10/30* (2013.01); *B60W 20/13* (2016.01); *B60K 2006/268* (2013.01); *B60K 2006/4825* (2013.01); *B60W 2510/0676* (2013.01); *B60W 2510/244* (2013.01); *B60W 2710/021* (2013.01); *B60W 2710/0644* (2013.01); *B60W 2710/081* (2013.01); *B60Y 2200/92* (2013.01); *B60Y 2300/192* (2013.01); *Y02T 10/6252* (2013.01); *Y02T 10/6286* (2013.01); *Y10S 903/906* (2013.01); *Y10S 903/93* (2013.01)

(58) Field of Classification Search
CPC ...... B60W 20/40; B60W 10/06; B60W 10/02; B60W 10/08; Y10S 903/93
See application file for complete search history.

(56) References Cited

U.S. PATENT DOCUMENTS 6,688,411 B2  2/2004 Boggs et al.
8,763,578 B2 * 7/2014 Poeltenstein ............ B60K 6/48
                                                    123/179.28

(Continued)

Primary Examiner — Anne M Antonucci
(74) Attorney, Agent, or Firm — David Kelley; McCoy Russell LLP

(57) ABSTRACT

Systems and methods for cranking an engine of a hybrid vehicle that includes an electric machine to crank the engine and propel the vehicle are disclosed. In one example, engine cranking speed and engine cranking source are selected in response to vehicle operating conditions that may affect whether or not an electrical power source has sufficient energy to crank the engine.

12 Claims, 4 Drawing Sheets

(51) Int. Cl.
*B60W 10/30* (2006.01)
*B60K 6/48* (2007.10)

(56) References Cited

U.S. PATENT DOCUMENTS

| | | |
|---|---|---|
| 2011/0118078 A1 | 5/2011 | Kraska et al. |
| 2013/0297105 A1 | 11/2013 | Yamazaki et al. |
| 2014/0046529 A1 | 2/2014 | Gibson et al. |
| 2015/0112523 A1 | 4/2015 | Wang et al. |

* cited by examiner

METHODS AND SYSTEM FOR STARTING AN ENGINE OF A HYBRID VEHICLE

CROSS REFERENCE TO RELATED APPLICATIONS

The present application is a divisional of U.S. patent application Ser. No. 14/448,917, entitled "METHODS AND SYSTEM FOR STARTING AN ENGINE OF A HYBRID VEHICLE," filed on Jul. 31, 2014, the entire contents of which are incorporated herein by reference for all purposes.

FIELD

The present description relates to methods and a system for starting an engine of a hybrid vehicle during different operating conditions. The methods may be particularly useful for hybrid vehicles that include a driveline disconnect clutch, electric motor, and an engine.

BACKGROUND AND SUMMARY

An engine of a hybrid vehicle may be started by rotating the engine with a high voltage electric machine and supplying spark and fuel to the engine. The electric machine may rotate the engine to a desired engine idle speed before the engine is supplied with spark and fuel. Alternatively, the electric machine may rotate the engine at a cranking speed (e.g., 200 RPM) at which time spark and fuel may be supplied to the engine. Some hybrid vehicles include a driveline disconnect clutch that is positioned between the engine and the high voltage electric machine. The driveline disconnect clutch allows the high voltage electric machine to operate independently from the engine. Consequently, the vehicle has the capability of being propelled solely via the high voltage electric machine. However, the driveline disconnect clutch may make it more difficult to start the engine at cold ambient temperatures because the driveline disconnect clutch requires a pump to supply it pressurized working fluid in order to close so that the engine may be rotated. Consequently, the high voltage electric machine, engine, and the working fluid pump may have to be rotated by the high voltage electric machine at a time when the battery that provides power to the high voltage electric machine may exhibit reduced output power due at least in part to a lower battery discharge limit.

The inventors herein have recognized the above-mentioned disadvantages and have developed a driveline method, comprising: adjusting an electric machine to a first speed in response to a request to start an engine; adjusting the electric machine to a second speed after achieving the first speed in response to the request to start the engine; and starting an engine via closing a driveline disconnect clutch while or after transitioning the electric machine to the second speed in response to the request to start the engine.

By rotating a driveline at a first speed before lowering driveline speed and cranking an engine at a second speed, it may be possible to provide the technical result of starting the engine at lower temperatures where a battery supplying electrical power to the electric machine may have reduced discharge power limits (e.g., kW). For example, an electric machine may be rotated at a first higher speed to provide working fluid pressure capable of closing a driveline disconnect clutch. After the desired working fluid pressure is achieved, the electric machine speed may be reduced to a speed where the engine may be cranked with less torque than if the engine were cranked at higher speeds. Consequently, a desired working fluid pressure to close a driveline disconnect clutch may be achieved, and the engine may be cranked without the reduced energy storage device discharge limits being exceeded.

The present description may provide several advantages. In particular, the approach may allow an engine to be started during conditions of lower energy storage device discharge limits. Further, the approach may provide alternative ways to start an engine of a hybrid vehicle. Further still, the approach may reduce the possibility of vehicle component degradation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
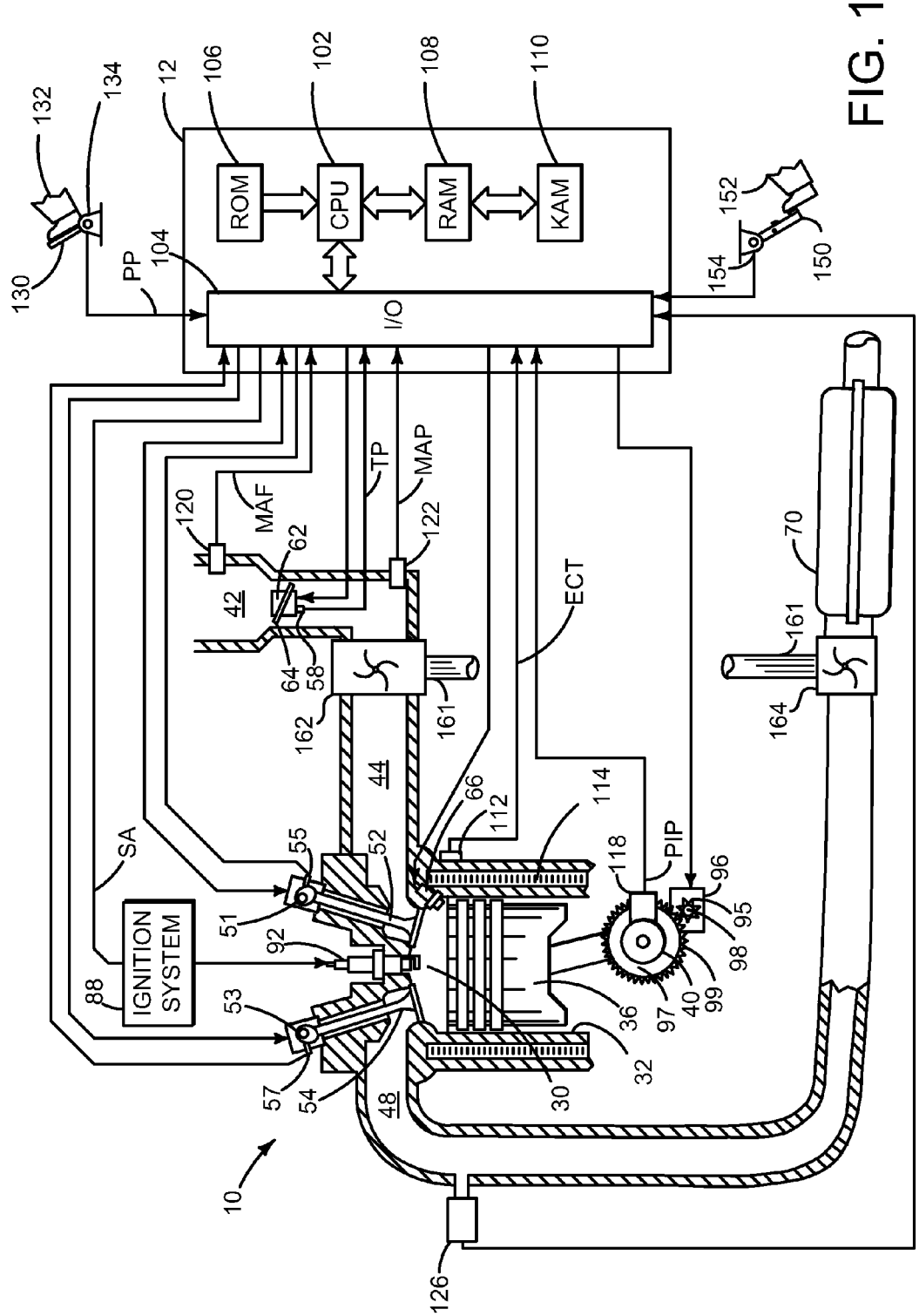
FIG. 1 is a schematic diagram of an engine.
Figure 2:
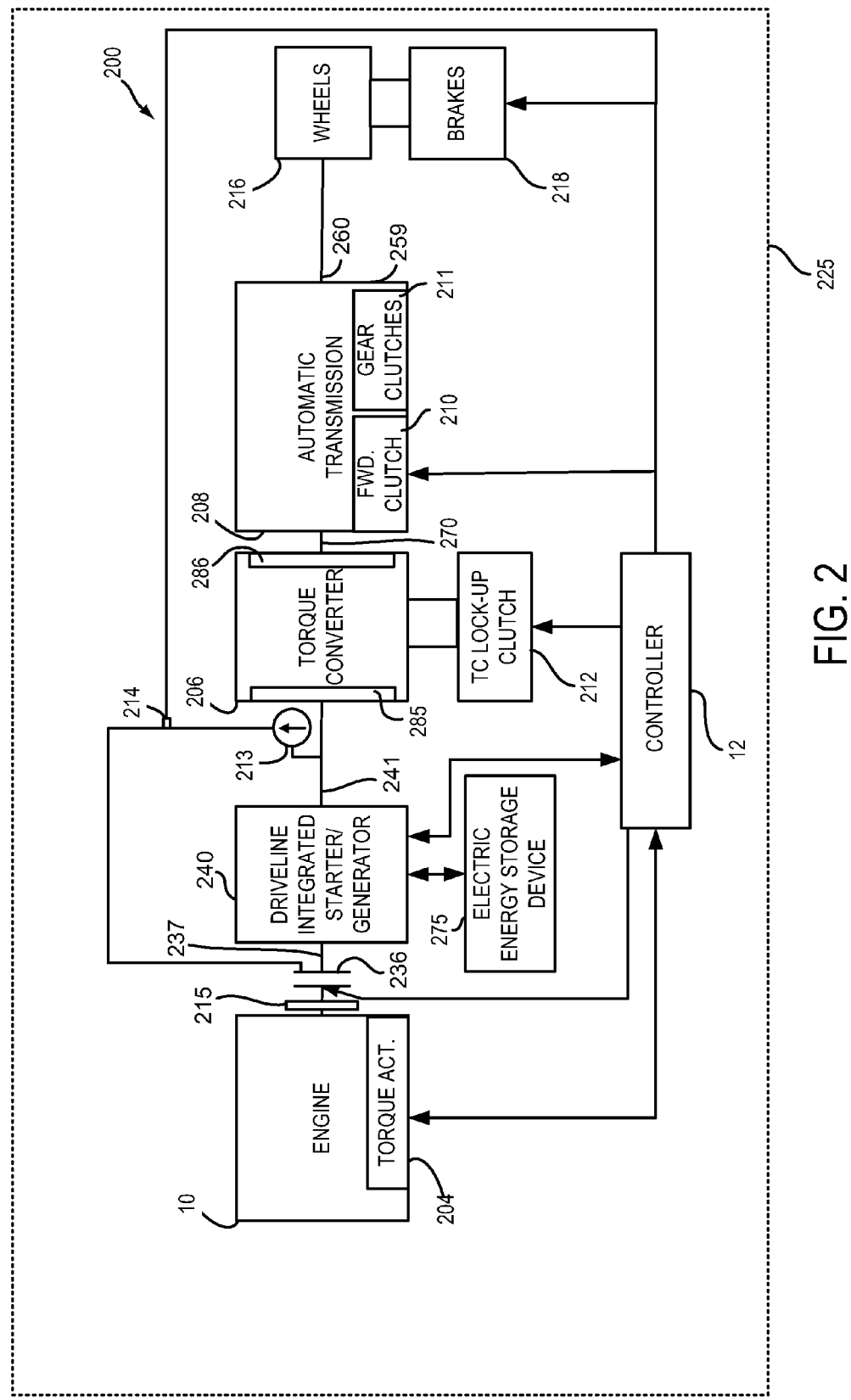
FIG. 2 shows an example vehicle driveline configuration.
Figure 3:
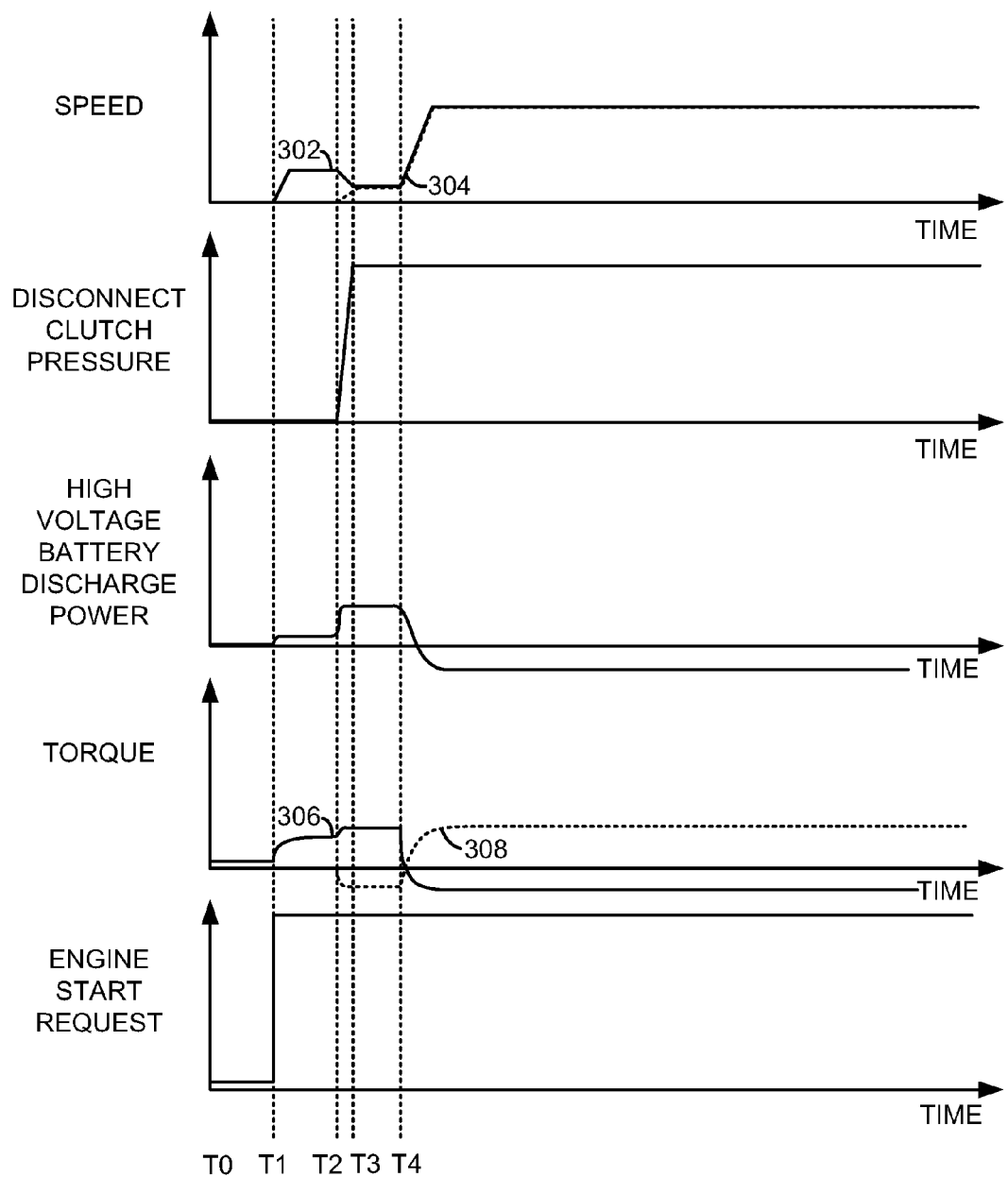
FIG. 3 shows an example engine starting sequence.
Figure 4:
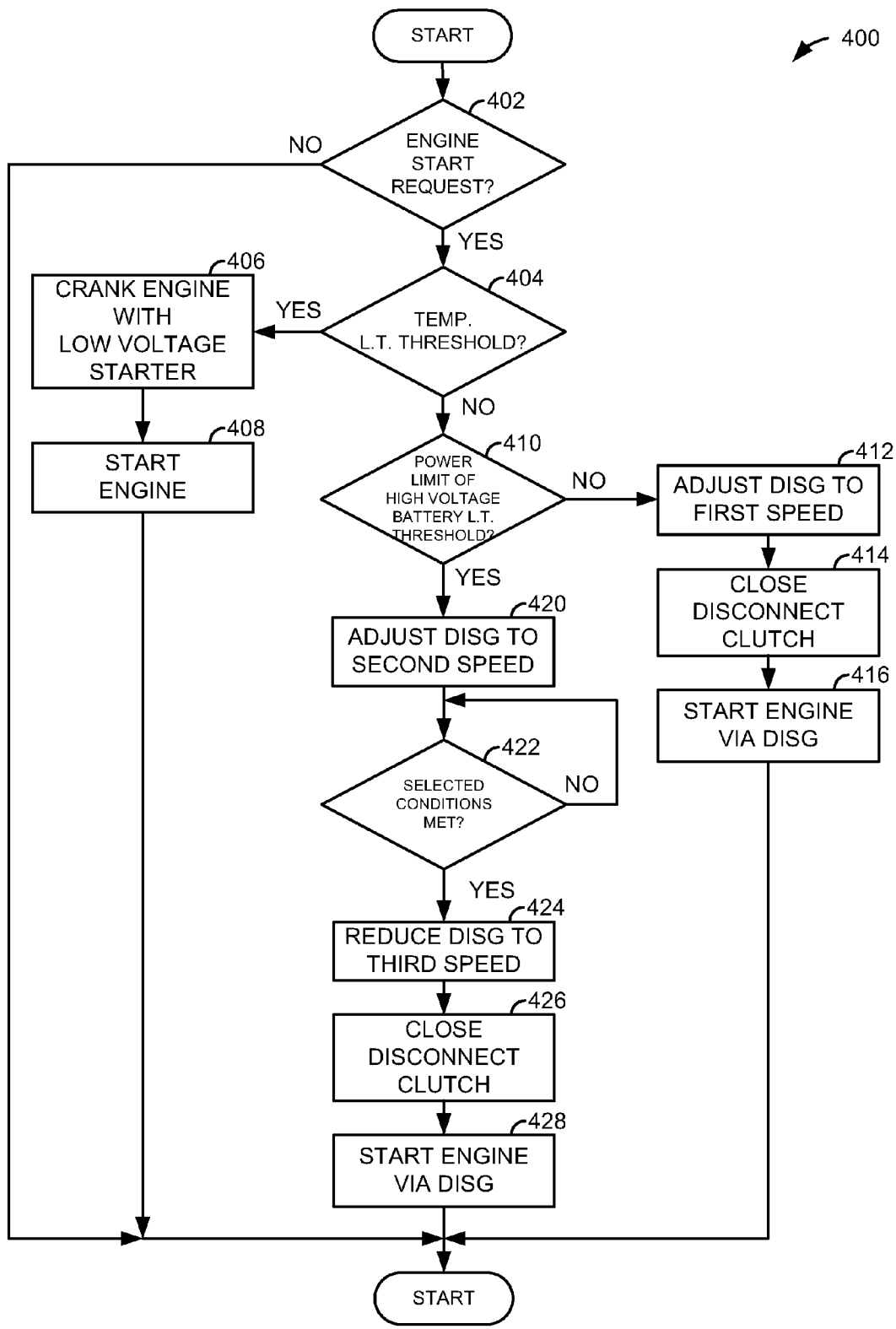
FIG. 4 shows an example method for starting an engine of a hybrid vehicle.

The present description is related to improving engine starting of a hybrid vehicle. The engine may be an engine as shown in FIG. 1 or a diesel engine. The engine may be included in a driveline of a hybrid vehicle as is shown in FIG. 2. The engine may be started according to the method of FIG. 4 as is shown in the sequence of FIG. 3. The method of FIG. 4 provides different ways of starting an engine in response to vehicle operating conditions.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width from controller 12. Fuel is delivered to fuel injector 66 by a fuel system (not shown) including a fuel tank, fuel pump, and fuel rail (not shown).

In addition, intake manifold 44 is shown communicating with turbocharger compressor 162. Shaft 161 mechanically couples turbocharger turbine 164 to turbocharger compressor 162. Optional electronic throttle 62 adjusts a position of throttle plate 64 to control air flow from air intake 42 to compressor 162 and intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a driveline 200. The driveline of FIG. 2 includes engine 10 shown in FIG. 1. Driveline 200 may be powered by engine 10. Engine 10 may be started with an engine starting system shown in FIG. 1 or via driveline integrated starter/generator (DISG) 240. DISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input side of driveline disconnect clutch 236 through dual mass flywheel 215. Disconnect clutch 236 may be electrically or hydraulically actuated. If disconnect clutch 236 is hydraulically actuated, pump 213 supplies working fluid (e.g., oil) to driveline disconnect clutch 236. Pump 213 may be incorporated into torque converter 206 or transmission 208, and pump 213 rotates to supply pressurized working fluid to driveline disconnect clutch 236 and clutches 210-211. Pump 213 is mechanically driven and it rotates to pressurize working fluid when shaft 241 rotates. Pressure at an outlet of pump 213 may be determined via pressure sensor 214. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 (e.g., high voltage battery or power source) may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by craning engine 10 and resuming cylinder combustion.

Thus, the system of FIGS. 1 and 2 provides for a driveline system, comprising: an engine; a low voltage electrical machine mechanically coupled to the engine; a high voltage electric machine; a driveline disconnect clutch positioned between the engine and the high voltage electric machine; and a controller including executable instructions stored in non-transitory memory for cranking the engine via the high voltage electric machine or the low voltage electric machine in response to a temperature, and further instructions for adjusting a cranking speed of the engine in response to the temperature only when the high voltage electric machine cranks the engine. The driveline system includes where the cranking speed of the engine is an engine speed where spark and fuel are first supplied to the engine after an engine stop. The driveline system includes where the high voltage electric machine cranks the engine at a second speed after achieving a first speed in response to an engine start request when the temperature is less than a threshold temperature, the first speed greater than the second speed. The driveline system includes where the high voltage electric machine cranks the engine without engine speed being reduced after an engine stop when the temperature is greater than the threshold temperature. The driveline system further comprises additional instructions for reducing the cranking speed of the engine in response to battery power limits.

Referring now to FIG. 3, an example engine starting sequence for a hybrid vehicle during cold operating conditions is shown. The sequence of FIG. 3 may be provided by the system of FIGS. 1 and 2 executing the method of FIG. 4.

The first plot from the top of FIG. 3 is a plot of high voltage electric machine speed (DISG) and engine speed versus time. The high voltage electric machine speed and engine speed increase in the direction of the Y axis arrow. High voltage electric machine speed is indicated by the solid trace 302. Engine speed is represented by dotted line 304. The X axis represents time and time increases from the left side of FIG. 3 to the right side of FIG. 3.

The second plot from the top of FIG. 3 is a plot of driveline disconnect clutch pressure versus time. Driveline disconnect clutch closing force may be substituted for driveline disconnect clutch pressure. The Y axis represents driveline disconnect clutch pressure and pressure increases in the direction of the Y axis arrow. The driveline disconnect clutch is closed when the disconnect clutch pressure trace is near the Y axis arrow and open when the driveline disconnect pressure trace is near the X axis. The X axis represents time and time increases from the left side of FIG. 3 to the right side of FIG. 3.

The third plot from the top of FIG. 3 is a plot of high voltage energy source (e.g., battery) discharge power versus time. The Y axis represents high voltage energy source discharge power and discharge power increases in the direction of the Y axis arrow. Discharge power is negative below the X axis. The X axis represents time and time increases from the left side of FIG. 3 to the right side of FIG. 3.

The fourth plot from the top of FIG. 3 is a plot of engine torque and high voltage electric machine torque versus time. The Y axis represents torque and torque increases in the direction of the Y axis arrow. High voltage machine torque is represented by solid line 306 and engine torque is represented by dotted line 308. The X axis represents time and time increases from the left side of FIG. 3 to the right side of FIG. 3.

The fifth plot from the top of FIG. 3 is a plot of an engine start request versus time. The engine start request is asserted when the trace is at a higher level near the Y axis arrow. The engine start request is not asserted when the trace is at a lower level near the X axis. The X axis represents time and time increases from the left side of FIG. 3 to the right side of FIG. 3.

At time T0, the DISG speed and the engine speed are zero indicating that the vehicle is stopped. The driveline disconnect clutch is in an open state allowing the DISG to rotate independently and/or without rotating engine. The high voltage battery discharge power is also zero indicating that the high voltage battery is not being discharged. The DISG torque and engine torque are also zero. The engine start request is not asserted.

At time T1, the engine start request is asserted in response to a driver or controller request. The engine and DISG temperature are at a low level (not shown) and high voltage battery discharge power may also be low. However, DISG torque and current may be elevated during such conditions when rotating the engine due to increased engine friction, oil viscosity, and battery operating characteristics. The DISG speed is increased to a first speed and the disconnect clutch remains open. Engine speed remains at zero. The DISG rotates pump 213 which supplies pressurized working fluid to the driveline disconnect clutch 236. The high voltage battery discharge power increases as the DISG speed increases and the DISG torque increases. The engine torque remains at zero since the driveline disconnect clutch is open.

At time T2, the DISG speed is decreased to a second speed and the driveline disconnect clutch pressure begins to increase to close the driveline disconnect clutch so that torque may be transferred from the DISG to the stopped engine. The DISG speed may be decreased to the second speed after a predetermined amount of time since the DISG reached the first speed has elapsed. Alternatively, the DISG speed may be decreased to the second speed in response to working fluid pressure at an outlet of pump 213 reaching a threshold pressure. The threshold pressure may be a pressure sufficient to close the driveline disconnect clutch. Reducing the DISG speed to the second speed may reduce the amount of torque the DISG needs to rotate the engine as compared to if the DISG were to rotate the engine at the first speed. Further, the DISG may have additional torque capacity at the second speed as compared to the first speed depending on the first and second speeds and the DISG output torque characteristics. The high voltage battery discharge power increases as DISG torque is increased to maintain DISG speed at the second speed as the driveline disconnect clutch is closed. The engine torque increases in a negative direction as the engine begins to rotate in response to the driveline disconnect clutch closing. The engine start request remains asserted.

At time T3, the driveline disconnect clutch is fully closed and the DISG speed reaches the second speed. The high voltage battery discharge power levels off to a constant value as the engine rotates at the second speed. The DISG torque also levels off at a constant torque that it takes to crank the engine at the second speed and rotate the torque converter impeller. Spark and fuel (not shown) are supplied to the engine so that the engine may be started. The engine start request remains asserted.

At time T4, the engine begins to combust air-fuel mixtures and the engine begins to accelerate the DISG. The DISG torque is reduced and it moves toward a negative torque. The high voltage battery discharge also begins to be reduced as the DISG output torque is reduced in response to the engine accelerating. The driveline disconnect clutch remains locked and engine torque increases in a positive direction. The engine start request remains asserted.

In this way, it may be possible to first rotate the driveline at a speed where a desired working fluid pressure to close the driveline disconnect clutch is provided by a pump that is mechanically driven by the driveline. Further, the driveline speed may then be reduced to a speed where engine friction may be reduced and/or DISG output torque may be increased so that the DISG may have sufficient torque to rotate the engine at lower ambient temperatures. Thus, working fluid pressure may be increased and engine friction may be held to a lower value to improve the possibility of engine starting at low ambient temperatures.

Referring now to FIG. 4, a method for starting an engine of a hybrid vehicle is shown. The method of FIG. 4 may provide the operating sequence shown in FIG. 3. Additionally, the method of FIG. 4 may be included in the system of FIGS. 1 and 2 as executable instructions stored in non-transitory memory.

At 402, method 400 judges if there is an engine start request. An engine start request may be originated by a driver or a controller. A driver may initiate an engine start request by turning a key or operating a pushbutton. A controller may initiate an engine start request via changing state of a variable in memory or a state of an output. If method 400 judges that there is an engine start request, the answer is yes and method 400 proceeds to 404. Otherwise, method 400 proceeds to exit.

At 404, method 400 judges if a temperature is less than a threshold temperature. In one example, the temperature is an engine temperature. In another example, the temperature is a DISG temperature. In still another example, the temperature is an energy storage device temperature. In still other examples, method 400 may select a lowest temperature from a group of devices not limited to the DISG, battery, engine, ambient air, and oil as a basis for comparing to the threshold temperature. If method 400 judges that the temperature is less than the threshold temperature, the answer is yes and method 400 proceeds to 404. Otherwise, the answer is no and method 400 proceeds to 412.

At 406, method 400 cranks the engine via a low voltage electrical machine or a starter motor 96. The starter motor is supplied power by a low voltage battery (e.g., less than 30 volts). The low voltage electrical machine may rotate the engine at a speed of less than 300 RPM. The low voltage starter may be supplied electrical power from a source different than the high voltage energy storage device. Therefore, the low voltage starter may be able to generate more torque than the DISG during some operating conditions such as when reduced battery discharge limits are in effect. Method 400 proceeds to 408 after beginning to crank the engine.

At 408, method 400 supplies spark and fuel to start the engine as the engine is cranked (e.g., rotated) by the low voltage starter. The low voltage starter may rotate the engine at a speed that is different from a speed that the DISG rotates the engine during engine starting. Method 400 proceeds to exit after the engine is started.

At 410, method 400 judges whether or not a battery discharge power limit is less than a threshold. The battery discharge power limit may vary with battery temperature, battery state of charge (SOC), and other conditions. If method 400 judges that the high voltage battery discharge power limit is less than a threshold, the answer is yes and method 400 proceeds to 420. Otherwise, the answer is no and method 400 proceeds to 412.

At 412, method 400 adjusts DISG to a first speed. The first speed may be a speed at which pump 213 provides sufficient pressure to close the driveline disconnect clutch (e.g., 300 RPM) in a predetermined amount of time. Method 400 proceeds to 414 after the DISG is adjusted to the first speed.

At 414, method 400 starts to close the driveline disconnect clutch. The driveline disconnect clutch may be closed by allowing working fluid to reach the driveline disconnect clutch from pump 213. Method 400 proceeds to 416 after the driveline disconnect clutch begins to close.

At 416, method 400 starts the engine via rotating the engine via the DISG and by supplying spark and fuel to the engine. Spark and fuel may be supplied to the engine as soon as engine position is determined. Method 400 proceeds to exit after the engine is started by rotating the engine at a single cranking speed.

At 420, method 400 adjusts DISG speed to a second speed. In one example, the DISG speed may be adjusted to a speed at which pump 213 provides sufficient pressure to close the driveline disconnect clutch (e.g., 300 RPM) in a predetermined amount of time. The second speed may be different than the first speed described at 412. Further, the second speed may be adjusted or calibrated to different levels based on vehicle operating conditions. Method 400 proceeds to 422 after the DISG speed is adjusted to the first speed.

At 422, method 400 judges whether or not select conditions have been met. In one example, the select condition may be that a threshold time from a time the DISG reaches the first speed. In another example, the select condition may be that an outlet pressure of pump 213 has reached a threshold pressure. If method 400 judges that one or more selected conditions have been met, the answer is yes and method 400 proceeds to 424. Otherwise, the answer is no and method 400 returns to 422.

At 424, method 400 reduces the DISG to a third speed. In one example, the third speed is a speed where engine friction is less than a threshold value and where engine speed is greater than a threshold speed. The third speed is also less than the second speed, and the third speed may be calibrated or adjusted to different speeds based on operating conditions. Method 400 proceeds to 426 after DISG speed begins to be adjusted to the third speed.

At 426, method 400 begins to close the driveline disconnect clutch. The driveline disconnect clutch may be closed via supplying a working fluid to the driveline disconnect clutch. Method 400 proceeds to 428 after the driveline disconnect clutch begins to close.

At 428, method 400 starts the engine via the DISG when DISG speed is at the third speed. The engine is started by supplying spark and fuel to the engine. The driveline disconnect clutch transfers torque from the DISG to the engine when the engine is being started. The engine speed may be ramped to idle speed after engine run-up from cranking speed. Method 400 proceeds to exit after the engine is started.

In this way, an engine of a hybrid vehicle may be started via different electric machines in response to vehicle operating conditions. Further, speeds of the electric machine may be varied between two or more substantially constant speeds during the engine starting process. By operating the driveline at different speeds during engine starting, it may be possible to start the engine even when battery discharging limits are reduced.

Thus, the method of FIG. 4 provides for a driveline method, comprising: adjusting an electric machine to a first speed in response to a request to start an engine; adjusting the electric machine to a second speed after achieving the first speed in response to the request to start the engine; and starting an engine via closing a driveline disconnect clutch while or after transitioning the electric machine to the second speed in response to the request to start the engine. The method includes where the engine is at rest when the electric machine is adjusted to the first speed. The method includes where the electric machine is adjusted to the second speed in further response to an outlet pressure of a pump. The method includes where the electric machine is adjusted to the second speed in further response to a predetermined amount of time since the first speed was achieved.

In some examples, the method includes where the first speed is greater than the second speed. The method also includes where closing the driveline disconnect clutch while transitioning the electric machine to the second speed includes closing the driveline disconnect clutch after the electric machine achieves the second speed. The method further comprises adjusting engine speed to a desired idle speed after the engine is started.

The method of FIG. 4 also provides for a driveline method, comprising: in response to a first engine start request, adjusting a speed of an electric machine to a first speed and closing a driveline disconnect clutch; and in response to a second engine start request, adjusting the speed of the electric machine to a second speed, adjusting the speed of the electric machine to a third speed after achieving the second speed, and closing the driveline disconnect clutch during transitioning from the second speed to the third speed. The method further comprises adjusting the speed of an electric machine to the first speed and closing the driveline disconnect clutch in response to a temperature of a device during the first engine start request.

In some examples, the method further comprises adjusting the speed of the electric machine to the second speed, adjusting the speed of the electric machine to the third speed after achieving the second speed, and closing the driveline disconnect clutch during transitioning from the second speed to the third speed in response to the temperature of the device during the second engine start request. The method also includes where the device is an engine. The method includes where the device is an energy storage device or the electric machine. The method further comprises starting an engine after beginning to close the driveline disconnect clutch in response to the first and second engine start requests. The method includes where the second speed is greater than the third speed. The method includes where the electric machine is a high voltage electrical machine, and further comprising starting the engine via a low voltage electric machine in response to a third engine start request at an ambient temperature that is less than ambient temperature during the first and second engine start requests.

As will be appreciated by one of ordinary skill in the art, the methods described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A driveline method, comprising:
adjusting an electric machine to a first speed responsive to a request to start an engine;
adjusting the electric machine to a second speed, lower than the first speed, after achieving the first speed responsive to the request to start the engine; and
starting the engine via closing a driveline disconnect clutch while or after transitioning the electric machine to the second speed responsive to the request to start the engine.

2. The method of claim 1, where the engine is at rest when the electric machine is adjusted to the first speed.

3. The method of claim 1, where the electric machine is adjusted to the second speed in further response to an outlet pressure of a pump.

4. The method of claim 1, where the electric machine is adjusted to the second speed in further response to a predetermined amount of time since the first speed was achieved.

5. The method of claim 1, where the first speed is greater than the second speed.

6. The method of claim 1, where closing the driveline disconnect clutch while transitioning the electric machine to the second speed includes closing the driveline disconnect clutch after the electric machine achieves the second speed.

7. The method of claim 1, further comprising adjusting engine speed to a desired idle speed after the engine is started.

8. A driveline system, comprising:
an engine;
a low voltage electric machine mechanically coupled to the engine;
a high voltage electric machine;
a driveline disconnect clutch positioned between the engine and the high voltage electric machine; and
a controller that cranks the engine via the high voltage electric machine or the low voltage electric machine wherein the high voltage electric machine or the low voltage electric machine is selected to crank the engine based on a detected vehicle component temperature, and wherein a cranking speed of the engine is adjusted in response to the detected vehicle component temperature only when the high voltage electric machine cranks the engine.

9. The driveline system of claim 8, where the cranking speed of the engine is an engine speed where spark and fuel are first supplied to the engine after an engine stop.

10. The driveline system of claim 8, where the high voltage electric machine cranks the engine at a second speed after achieving a first speed in response to an engine start request when the temperature is less than a threshold temperature, the first speed greater than the second speed.

11. The driveline system of claim 10, where the high voltage electric machine cranks the engine without engine speed being reduced after an engine stop when the temperature is greater than the threshold temperature.

12. The driveline system of claim 8, further comprising additional instructions for reducing the cranking speed of the engine in response to battery power limits.

\* \* \* \* \*